US008790780B2

(12) United States Patent
Torrey et al.

(10) Patent No.: US 8,790,780 B2
(45) Date of Patent: Jul. 29, 2014

(54) COMPOSITE COATING SYSTEMS FOR AIR HANDLING SYSTEMS

(75) Inventors: Bruce M. Torrey, Orlando, FL (US); Thomas R. Clinton, Orlando, FL (US)

(73) Assignee: Air Quality Innovative Solutions, LLC, Orlando, FL (US)

( * ) Notice: Subject to any disclaimer, the term of this patent is extended or adjusted under 35 U.S.C. 154(b) by 874 days.

(21) Appl. No.: 11/184,637

(22) Filed: Jul. 19, 2005

(65) Prior Publication Data
US 2007/0020460 A1    Jan. 25, 2007

(51) Int. Cl.
*B23B 37/00* (2006.01)
*C08L 63/00* (2006.01)

(52) U.S. Cl.
USPC ............ 428/416; 428/414; 428/418; 428/688

(58) Field of Classification Search
None
See application file for complete search history.

(56) References Cited

U.S. PATENT DOCUMENTS

| | | | |
|---|---|---|---|
| 3,330,228 A * | 7/1967 | Donnelly | 108/57.27 |
| 4,180,166 A | 12/1979 | Batdorf | |
| 4,872,573 A * | 10/1989 | Johnson et al. | 215/347 |
| 5,225,464 A * | 7/1993 | Hill, Jr. | 524/100 |
| 5,372,846 A * | 12/1994 | Feldman et al. | 427/224 |
| 5,554,433 A * | 9/1996 | Perrone et al. | 428/192 |
| 5,697,227 A | 12/1997 | Bruce et al. | |
| 5,934,617 A * | 8/1999 | Rutherford | 244/134 E |
| 6,096,812 A * | 8/2000 | Hanafin et al. | 524/100 |
| 6,167,717 B1 | 1/2001 | Dudley et al. | |
| 6,852,412 B2 * | 2/2005 | Keogh | 428/379 |
| 6,868,689 B1 | 3/2005 | McNeil et al. | |
| 2001/0047058 A1 * | 11/2001 | Johnson et al. | 525/192 |
| 2002/0098357 A1 * | 7/2002 | Keogh | 428/375 |
| 2002/0130131 A1 * | 9/2002 | Zucker et al. | 220/592.2 |
| 2010/0227171 A1 | 9/2010 | Thomas | |

OTHER PUBLICATIONS

April C. Murelio, MAGNA-Coat product extends service life of HVAC cooling towers, Mar. 13, 2001, 4 pgs.

* cited by examiner

*Primary Examiner* — John J Figueroa
(74) *Attorney, Agent, or Firm* — Brooks Kushman P.C.

(57) ABSTRACT

The present invention relates to composite coating systems and methods for the manufacture and reconstruction of condensate pans, floors or other internal structures of a heating ventilation and air conditioning (HVAC) or heating ventilation air conditioning and refrigeration (HVACR) unit. The composite coating system comprises a base epoxy coating and a top surface coating. The base epoxy coating is substantially free of volatile organic compounds (VOC's) and adheres to the condensate pans, floors or other internal structures of the HVAC or HVACR unit to fill pinholes and to provide corrosion and water resistance, and the top surface coating provides a barrier to high thermal exposure of the base coating.

19 Claims, 1 Drawing Sheet

COMPOSITE COATING SYSTEMS FOR AIR HANDLING SYSTEMS

BACKGROUND OF THE INVENTION

1. Technical Field

The present invention relates to composite coating systems and methods for the manufacture and reconstruction of condensate pans, floors, internal structures, and other related structures of Heating Ventilation and Air Conditioning (HVAC) or Heating Ventilation Air Conditioning and Refrigeration (HVACR) units. The composite coating systems and methods are especially suitable for commercial HVAC and HVACR units. The present invention also relates to composite coating systems and methods for other surfaces and applications. The present invention can, for example, reduce and/or prevent corrosion and/or fire hazards and/or smoke hazards.

2. Background

Metallic and cementicious condensate pan substrates, internal support structures, and flooring within a Heating Ventilation and Air Conditioning (HVAC) or Heating Ventilation Air Conditioning and Refrigeration (HVACR) unit are subjected to cyclic temperature, humidity and water exposure whereby corrosion often takes place. The condensate pans are of particular interest. They are often composed of steel, galvanized steel, stainless steel, concrete and the like. The condensate pans facilitate the collection and drainage of water as a direct result of the condenser coil functions within the main system unit. Water or moisture in the air-stream condenses on the coils because of temperature differential or humidification apparatus within the unit. The water drips from the coils into the collection pan where it is intended to drain into the waste water system. Internal structures (walls, ceilings, mechanical equipment supports, and flooring within the unit, for example) are all subject to corrosion and often need refurbishment.

Several commercial products are currently available for coating of condensate pans and other surfaces. Example for such products include the Foster Drip Pan Coating 40-60 (Foster Products, Palatine, Ill.), Pancrete (Controlled Release Technologies, Inc., Clearwater Fla.), MAGNA-Coat (MAGNA-Coat Industrial Coatings, Georgetown, Tex.), and SAFE Corrosion Control & Marine Systems (SAFE Encasement Systems, Las Vagas, N.V.). Existing products fall short in many respects.

A multitude of problems can occur during the lifecycle of these structures and systems within the HVAC or HVACR system environment, particularly with respect to condensate pans. For example, during pan installations or during routine maintenance the pan geometry and drainage slope are often compromised by being walked upon. Corrosion, equipment vibration, and normal wear and tear are also problematic to the overall integrity of the pan. In many cases, older pans were not originally designed with sloping features from the manufacturer.

The American Society of Heating, Refrigerating and Air-Conditioning Engineers (ASHRAE) Standard 62 1998, *"Ventilation for Acceptable Indoor Air Quality"* now requires drain pans to be designed for self-drainage or sloped to allow the water to properly drain. Uneven pan surfaces, whether originally designed as such or through other means, cause water to pond and become stagnant and may not satisfy ASHRAE standards.

In addition to corrosion from standing or ponding water, mold, fungus, slime and various other microbes can grow and flourish, causing the pan and drain system to become biologically unsafe. In addition to the biohazards created, the organisms eventually clog the drain system. The plugged drainage system and faulty pan designs add to the propensity of condensate water to pond, thereby causing further corrosion and microbial growth.

Over time, the accumulation of water promotes pan corrosion, eventually leading to leakage. Leakage infiltrates building structures and systems causing further issues with building components, electrical systems and equipment. Leaking water also furthers the proliferation of mold and microbial growth.

Past HVAC design practices have included pans made from sandwich composites of plastic foam (polyurethane, expanded polystyrene, etc.) encapsulated in sheet steel. These foam materials have been used as a water barrier in addition to providing insulation. Pan corrosion can and often does eat away the top layer of steel undesirably exposing the foam plastic to the environmental air-handling stream. Furthermore, the foam plastic material is extremely flammable and does not meet the NFPA 255 flammability requirements within the National Fire Code requirements of NFPA 90A. The composite coating system of the present invention has also been designed to encapsulate this foam, bringing it back into regulatory compliance.

In addition to the above issues, a significant problem that the industry has not yet overcome with typical pan refurbishment coatings is compliance with the National Fire Code. Pan refurbishments currently marketed in the form of coatings (or any combustible material used in condensate pan applications) should comply with the National Fire Code, promulgated by the National Fire Protection Association (NFPA). NFPA Standard 90A *"Standard for the Installation of Air-Conditioning and Ventilating Systems"*, 2002 edition specifically addresses this application.

The NFPA 90A code states that any combustible products within the environmental air handling stream must meet a maximum Flame Spread Index of 25 and a maximum Smoke Developed Index of 50 per NFPA 255 *"Standard Method of Test of Surface Burning Characteristics of Building Materials"*, 2002 Edition. The code also goes on to say that combustible products used in the HVAC air-stream must meet the flame and smoke performance requirements and do so without evidence of continued progressive combustion in the thickness and form in which they are intended to be used. Of course, it is undesirable to allow distribution of smoke from an HVAC system to a building. Embodiments of the composite coating system of the present invention can fully comply with these regulations. No other currently marketed products, including all of the known competitive coating products, meet this regulatory code requirement.

Condensation pans, floors and other components within commercial HVAC units can be quite large. Some condensate pans are on the order of 100 square feet or more. These large air-handling systems are prevalent in virtually all commercial buildings. Most of the 4.6 million commercial buildings in the United States have large HVAC units; some high-rise buildings can have 20 or more such units. Over time, due to stagnant water, pans that collect condensate water often corrode, leak and provide an ideal environment for the growth of mold, fungi and other biohazard organisms effecting Indoor Air Quality (IAQ). Legionellosis, Legionnaires' Disease (LD) and Pontiac Fever have been linked to IAQ issues.

The problem is often discovered when water leaking from condensate pans travel throughout the building, particularly to the floors below. Typical situations include hospital HVAC pans leaking on to very expensive and critical equipment such as a Magnetic Resonance Imaging (MRI) machines and other equipment. This leads to equipment corrosion, contamination and electrical shock safety issues, equipment downtime and the like.

As mentioned above, another problem associated with standing water within the pan is the growth of various biocontaminants like fungi, bacteria and other microorganisms. The HVAC system in a building delivers conditioned air to the occupants throughout the building for warmth, cooling, comfort, and breathing air necessary for the operation of the building. The delivery and spreading of biocontaminants in a building, such as through the HVAC system, is undesirable. Microbes need four basic ingredients to thrive: (1) organic nutrients or "food"; (2) moisture in the form of standing water or humid air; (3) a surface on which to grow; and (4) darkness. Therefore, if the HVAC air conveyance systems are kept clean and dry, the potential for microbial contamination within a building can be significantly reduced.

Various problems with HVAC systems are of particular concern within the healthcare, pharmaceutical, food manufacturing and educational industries and institutions.

SUMMARY OF THE INVENTION

The present invention provides composite coating systems and methods for the manufacture and reconstruction of components of air handling systems, such as Heating Ventilation and Air Conditioning (HVAC) or Heating Ventilation Air Conditioning and Refrigeration (HVACR) units. The components of the air handling systems may include condensate pans, floors, internal structures, and other related structures, for example. The present invention also provides composite coating systems and methods for other surfaces and applications. The present invention can, for example, reduce and/or prevent corrosion and/or fire hazards and/or smoke hazards.

One composite coating system of the present invention has a base coating of an epoxy, and a top surface coating which provides a barrier to high thermal exposures of the base coating. A condensate pan can be reconstructed using a cast in place composite coating system according to the present invention that consists of the base coating of the two-component epoxy with the top (barrier) surface of either a waterborne intumescing ceramic coating or a metallic faced foil laminate.

In an embodiment of the present invention, a composite coating system for an air handling system has a base coat substantially free of volatile organic compounds, and a combustion-barrier top coat on the base coat and providing a barrier to combustion of the base coat.

In another embodiment of the present invention, a composite coating system for reconstructing condensate pans, floors or other structures of heating ventilation and air conditioning (HVAC) or heating ventilation air conditioning and refrigeration (HVACR) systems has a base epoxy coating and a top surface coating. The base epoxy coating is substantially free of volatile organic compounds (VOC's) and adheres to the condensate pans, floors or other internal structures of the HVAC or HVACR systems, and the top surface coating provides a barrier to combustion of the base coating.

In a further embodiment of the present invention, an air handling system drip pan has a drip pan base, a base coat on the drip pan base, and a combustion-barrier top coat on the base coat. A combination of the combustion-barrier top coat and the epoxy base coat has a maximum flame spread index of about 25 and a maximum smoke developed index of about 50 per National Fire Protection Association (NFPA) code.

Another embodiment the present invention is a composite coating system for coating a surface to provide corrosion and fire resistance to the surface. The composite coating system has a base coat and a top coat on the base coat. The base coat is substantially free of volatile organic compounds and adheres to the surface, and the top coat provides a barrier to combustion of the base coat.

An embodiment of the present invention is a method for reconstructing a component of an air handling system. The method includes applying a base coat to the component of the air handling system, and applying a combustion resistant top coat to the base coat.

Embodiments of the composite coating system of the present invention can satisfy code regulations for HVAC and HVACR systems, including ASHRAE and NFPA codes mentioned herein. Embodiments of the present invention can also address the problems with existing products and devices mentioned herein. Embodiments of the present invention can address other problems and provide other advantages as well. The advantages and features of the present invention described herein may be desired, but are not necessarily required to practice the invention.

DETAILED DESCRIPTION OF THE INVENTION

The present invention provides composite coating systems and methods for the manufacture and reconstruction of components of air handling systems, such as Heating Ventilation and Air Conditioning (HVAC) or Heating Ventilation Air Conditioning and Refrigeration (HVACR) units. The components of the air handling systems may include condensate pans, floors, internal structures, and other related structures, for example. The composite coating systems and methods are especially suitable for commercial HVAC and HVACR units. The present invention also relates to composite coating systems and methods for other surfaces and applications, for example, reduce and/or prevent corrosion and/or fire hazards and/or smoke hazards.

Figure 1:
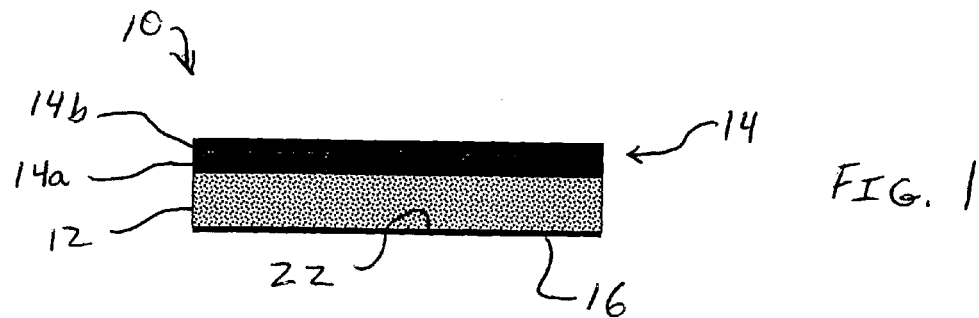
FIG. 1 is a cross-sectional view of a composite coating system with an intumescing ceramic coating on top of a base epoxy coating on a condensate pan.

An embodiment of the present invention is shown in FIG. 1 as a composite coating system 10. The composite coating system 10 has a base coat 12 and a top coat 14. The base coat 12 can be a two-component epoxy applied to a condensate pan 16. The top coat 14 can be a waterborne (water based) intumescing ceramic coating. The top coat 14 provides a barrier to high thermal exposures of the base coat 12. The condensate pan 16 can be reconstructed in the field using a cast-in-place composite coating system 10 that consists of the base coat 12 of the two-component epoxy applied to the condensate pan 16 and the top 14 applied to the base coat 12.

Figure 2:
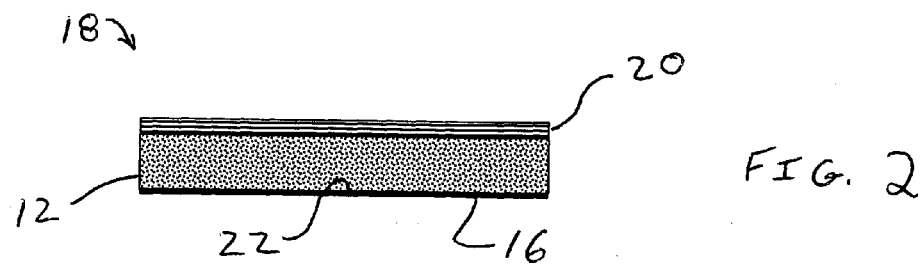
FIG. 2 is a cross-sectional view of a composite coating system with a metallic foil laminate on top of a base epoxy coating on a condensate pan.

FIG. 2 shows another embodiment of the present invention in which a composite coating system 18 has the epoxy base coat 12 and a top coat 20 made of a metallic-faced foil laminate. The top coats 14, 20 provide barriers to the base coat 12.

In an embodiment, the epoxy base coat 12 is made from substantially all solids, such as virtually 100% solids. This does not mean that the base coat 12 is necessarily made from absolutely 100% solids. For example, the percent solids of the epoxy may actually be in the ranges of about 75%-about 100%, about 80%-about 100%, or about 75%-about 80%, and ranges with other end points as well. This feature allows for the minimization of volatile organic compounds (VOC). This epoxy base coat 12 serves to fill holes, such as pinholes, in the pan and provides corrosion and water resistance to other structures. The base coat 12 also allows a top surface of the condensate pan 16 to be built up for proper sloping for drainage. Excellent adhesion properties and quick cure time are desired for practical field applications. For example, during the repair of a condensate pan 16, HVAC equipment shutdown time may be desired to be about 4-6 hours or less. Accordingly, it may be desirable for the epoxy cure time to be less than the equipment downtime. However, in embodiments, the cure time for the base coat 12 could be longer than the HVAC equipment downtime because the HVAC equipment can be reactivated prior to complete curing. One preferred epoxy system for the base coat 12 is a very low VOC compound, meeting all applicable EPA, including new California EPA regulations, and practicable olfactory requirements for sensitive environmental air-distribution applications like hospitals and schools. A very low VOC compound is contemplated as being substantially no VOC's, 0 VOC's, about or close to 0 VOC's as well.

Features of the epoxy base coat 12 may include room temperature curing, compliance with regulatory VOC emissions, and the non-offensive odors. In embodiments, the viscosity can range anywhere from around 50,000 cP to over 300,000 cP. The lower viscosity ranges may facilitate spray application while the higher end may require the product be applied using a trowel or similar spreading device. It is desirable for the initial viscosity of the epoxy for the base coat 12 to allow the material to be built up to a thickness of about 0.5 inch. The base coat 12 should also be viscous enough to bridge pinholes and other holes without readily running through. The present invention can be embodied in various thicknesses of the base coat 12, for example at any thickness in a range from about 0.001 inch to about 1.0 inch.

The epoxy base system is made from virtually 100 percent solids. This feature allows for the minimization of volatile organic compounds (VOC). One supplier of suitable VOC free epoxy is Advanced Nano Products. There are many other manufacturers of 100 percent solids epoxy coatings as well.

Further examples of materials for the base coat 12 include polyurethanes, polyvinyldioxlane-based polyurethanes, acrylic-polyurethanes, aliphatic polyureas, aromatic polyureas, polyurea elastomers, polyesters, acrylics, vinyls, styrene-butadienes, amine-solubilized, carboxyl-terminated alkyds and urethanes, water-based alkyds, vinyl esters, and combinations thereof.

The base coat 12 may not meet the NFPA 90A code requirements for flame and smoke by itself. To accomplish full compliance with the Fire Code, one of several barrier technologies can be employed by including a top surface (barrier) coat on top of the base coat 12.

In an embodiment of the composite coating system 10 shown in FIG. 1, the top coat 14 comprises a waterborne intumescing ceramic coating. The intumescing ceramic coating expands and forms a dense, structural "foam" layer when exposed to high temperatures. This layer then acts as an insulating fire-resistant barrier, separating the base coat 12 (substrate) from the flames. The top coat 14 also acts as a barrier displacing gasses that are liberated or distilled from the substrate base coat 12, thereby reducing available oxygen and volatile combustion gases right at the pyrolysis zone. The top coat 14 can intumesce (swell) up to 1000% of its dry film thickness to create a protective rigid foam barrier against heat and flame. In other words, the intumescing component reacts with heat to generate a non-combustible char layer. The intumescing ceramic coating is also a zero VOC emissions product.

FIG. 1 shows the top coat 14 as having two layers 14a, 14b both of which can be a waterborne intumescing ceramic coating. However, any number of layers may be provided, including a single layer or more than two layers. The layer 14a of FIG. 1 is a basecoat of waterborne intumescing ceramic coating over the epoxy base coat 12. The layer 14b is a protective water-resistant topcoat or sealer, which can be a ceramic latex material, for example. The water-resistant sealer layer 14b protects the composite coating system 10 from water or other corrosion damage.

The top coat 14 of FIG. 1 can applied by spraying, rolling, brushing or any other means typically used in the coating industry. The top coat 14 is adhered or bonded to the base coat 12. The uncured epoxy of the base coat 12 can also act as an adhesive to bond the top coat 14 to the base coat 12.

Examples of intumescing coatings are marketed by TPR2 Corp. According to TPR2 Corp., the intumescing coatings are water based, non-toxic, drain safe, non-fuming and produce no smoke or volatile organic compounds (VOC's). The coatings aggressively react with heat and flame to subside the heat and flame.

In the embodiment of FIG. 2, a metallic foil laminate is laminated to the exposed base coat 12 surface as the barrier top coat 20 for the composite coating system 18. The foil laminate composition can be of any metallic substrate or a plurality of metallic foils such as aluminum or stainless steel. These laminate materials with metallic foil facings provide an excellent barrier and reflector to high thermal exposures. This barrier technology protects the underlying substrate base coat 12 from direct flame and heat exposure and interrupts the pyrolysis interface zone, thereby starving the substrate base coat 12 of oxygen needed for combustion. This barrier approach also limits the liberation of combustible gases from the substrate base coat 12 during extreme heat exposure. This barrier approach employs the use of a foil system to act as a fire barrier to the substrate material by preventing factors necessary to support flaming combusting. These foil laminates have been referred to as scrim foils or scrim foil laminates.

Figure 3:
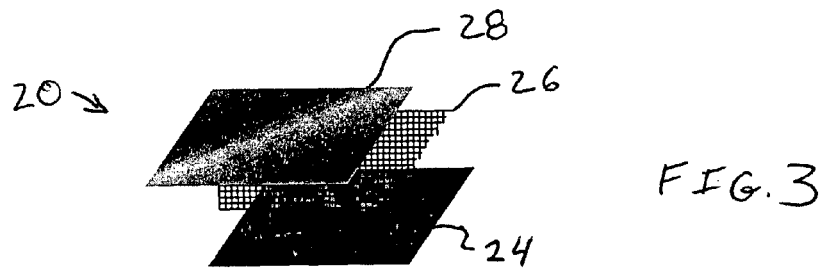
FIG. 3 is a detailed exploded schematic diagram of the various layers of an example of the metallic foil laminate of FIG. 2.
Figure 4:
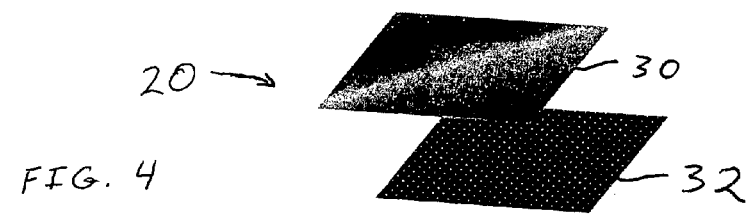
FIG. 4 is a detailed exploded schematic diagram of the various layers of another example of the metallic foil laminate of FIG. 2.

FIG. 3 shows an example of the metallic foil laminate top coat 20 of FIG. 2. The metallic foil laminate top coat 20 can be composites of laminated Kraft paper 24, woven fiberglass mat 26, and a thin foil 28 of aluminum or stainless steel or other suitable material. FIG. 4 shows another metallic foil laminate top coat 20 in which the top coat 20 has a top foil layer 30 and a mat layer 32. The top foil layer 30 can be a metallic foil, such as aluminum foil or stainless steel foil or other suitable material, for example. The mat layer 32 can be ceramic fiber mat or a glass fiber mat, for example. Some foil laminates may consist of a foil laminated to a fibrous ceramic or glass mat while others consist of various combinations of foils, papers and fibers laminated together. Theses systems have excellent flame spread and smoke properties and once laminated to the substrate base coat 12 provide a protective barrier to the base coat substrate material. The top foil layers 28, 30 can also provide corrosion protection, such as water resistance. A sealer coating, such as a water-resistant sealer, can also be applied to the top side of the foil layers 28, 30.

The thermal insulation of the substrate base coat 12 and the retardation or prevention of flame spread and smoke of the metallic foil laminates can be desired features. Like the intumescing top coatings, the metallic foil laminates act as a barrier to the flammable substrate epoxy base coat 12. The metallic foil laminate is applied onto the curing epoxy substrate base coat 12 and the epoxy can serve as an adhesive layer to the substrate base coat 12. Foil laminates and foil scrim materials can be supplied in rolls and cut to a desired size and then applied to the substrate base coat 12. Several companies manufacture and market foil laminates (scrim) type products. For example, Unifrax Corporation (Niagara Falls, N.Y.) and Compac Corporation (Hackettstown, N.J.) market foil laminates.

The thickness of the composite coating system is preferably about 0.5 inch, including, in combination, the base coat and the top coat. In an embodiment, the thickness of the base coat 12 is about 0.5 inch. In an embodiment, the thickness of the top coat 14 is about 0.040 inch, and in another embodiment the thickness of the top coat 20 is about 0.010 inch. The thickness of the composite coating system can be any desired thickness suitable for the particular application. For example, the composite coating system may have any thickness in a range of about 0.001 inch to about 1.0 inch.

Figure 5:
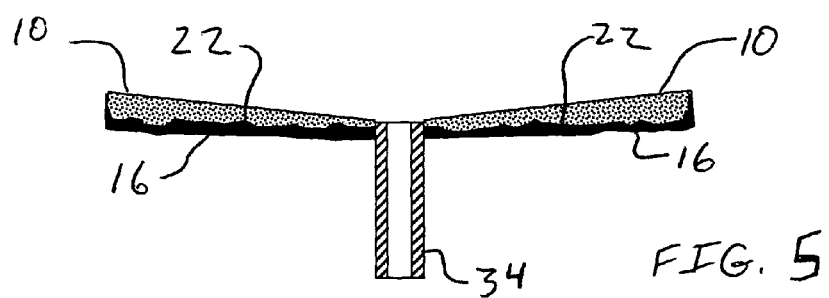
FIG. 5 is a cross-sectional view of a reconstructed condensate pan coated with the composite coating system showing the drainage slope directing condensate water in the condensate pan to a drain pipe.

FIG. 5 shows the composite coating system applied to a condensate pan 16 having a drain pipe 34. The composite coating system 10, 18 refurbishes the pan 16 and also remediates defect in the condensate pan 16 caused by corrosion, use and abuse, and design defects associated with improper pan slope necessary to facilitate condensate water drainage. The composite coating system 10, 18 can remediate leakage, corrosion, and pan biocontaminant issues while providing a new surface that is properly sloped to drain the condensate water.

The renovation process corrects improper slope issues and allows for drainage, thereby eliminating the ability of water to pond within the pan 16. The composite coating system and application process also addresses current and future growth of microorganisms, by correcting the water retention problem and by utilizing materials that resist the future growth of these organisms.

The composite coating system 10, 18 is designed to go over the existing condensate pan 16. During the installation process the pan 16 is thoroughly cleaned and repairs are made. The base coat 12 seals up any pinholes, other holes or imperfections causing leakage and provides an anti-corrosive protective surface. The base coat 12 seals and insulates the existing pan 16 from water eliminating any further corrosion or decay. The intrinsic viscosity of the base coat 12 also allows the pan 16 to be re-shaped by building up areas needed for proper sloping of the pan 16 for drainage.

The composite coating systems of the present invention can also be applied to the other corroded and contaminated components within or related to the HVAC system (support structures, floors, etc) and exhibit the same performance qualities.

The composite coating system of the present invention allows for the buildup of condensate pan deformities so that proper drainage sloping can be accommodated. Embodiments of the composite coating system has been designed with appropriate viscosity so the composite coating system can be built-up to as much as about 0.5 inch thickness. The composite coating system can also be developed to comply with the National Fire Code, promulgated by the National Fire Protection Association (NFPA) Standard 90A. The inventor knows of no other system that provides these features at these thicknesses.

A sample of the composite coating system 10 of FIG. 1 was made and tested. The sample had a base coat 12 of epoxy and a top coat 14, including an intumescing coating. The epoxy base coat 12 was an Advanced Nano Products', Firewall, 100 percent solids, two-component epoxy. The top coat layer 14a was a waterborne ceramic intumescing coating from TPR2 Corp., specifically, SCHTI-ED material. The top coat layer 14b was a sealer, specifically a TPR2 Corp. HS-1 sealer. The overall nominal thickness of the sample was about 0.5 inch. The sample was tested per NFPA 255 (ASTM E84) by SGS U.S. Testing, Inc. The sample achieved a Flame Spread Index of 5 and a Smoke Developed Index of 0. Furthermore, the test showed the sample had a Flame Spread Index of 5 and a Smoke Developed index of 0 without evidence of continued progressive combustion. NFPA 90A requires a maximum Flame Spread Index of 25 and a maximum Smoke Developed Index of 50. (See SGS U.S. Testing, Inc. Report No. 315585-1, commercial identification Medicast IntuCeram 90A.) Embodiments of the present invention can provide a maximum Flame Spread Index of 25 and a maximum Smoke Developed Index of 50. Embodiments of the present invention can provide a maximum Flame Spread Index of about 5 and a maximum Smoke Developed Index of about 0. The present invention can have a Flame Spread Index of about 0-25 or 0-5 or any endpoints within those ranges. The present invention can have a Smoke Developed Index of about 0-50 or any endpoints within that range. The present invention can be practiced to provide any particular flame spread index and/or smoke developed index in those ranges. For example, the top coat material, structure, and application to the base coat can be selected or designed to provide any particular flame spread index and/or smoke developed index.

The composite coating system can also be practiced to meet United States Environmental Protection Agency (EPA) and indoor air quality considerations. For example, embodiments of the present invention can meet EPA guidelines for VOC's according to EPA Document No. EPA-453/R-97-004. Embodiments of the composite coating system can meet California VOC coatings standards.

Another consideration in the development of this technology is air distribution equipment installation downtime. The two-component epoxy system cures to a working hardness within an hour or so, allowing for adequate installation work time while minimizing the unit downtime. Downtime is particularly important in critical building functions like hospitals, pharmaceutical manufacturing, school systems, food manufacturing and the like. Hospitals in particular are sensitive to maximum unit downtimes of around four hours. Extended installation downtimes in many critical function settings is impracticable.

The composite coating system is also a cost effective alternative to total condensate pan replacement. Critical cost factors like system downtime and replacement costs are minimized. Alternative solutions often require the total replacement of the pan whereby the coils and other system components must also be removed and replaced in addition to the pan. The composite coating system can by installed without the need to remove these critical and expensive components. Also, the present invention can be practiced by manufacturing new products, such as condensate pans for example, rather than refurbishing used products.

Although the present invention is described for coating of the condensate pans, floors, internal structures, or other structures of Heating Ventilation and Air Conditioning (HVAC) or Heating Ventilation Air Conditioning and Refrigeration (HVACR) units (collectively referred to as HVAC), the composite coating system can also be applied to other surfaces requiring corrosion or water resistance, filling pinholes, other holes and imperfections, leveling of the surfaces, or high thermal exposures. The present invention is also applicable to composite coating systems and methods for other surfaces and applications, for example, to reduce and/or prevent corrosion and/or fire hazards and/or smoke hazards.

Furthermore, it should be understood that various changes and modifications to the presently preferred embodiments described herein will be apparent to those skilled in the art. Such changes and modifications can be made without departing from the spirit and scope of the present invention. It is therefore intended that such changes and modifications be covered by the appended claims.

The invention claimed is:

1. A cast-in-place composite coating system applied to a drain pan of an HVAC or an air handling system to reconstruct or repair the drain pan, the coating system comprising:
   an epoxy base coat applied to the drain pan and configured to fill holes or crevices therein, thereby arresting corrosion, restoring surface structure, repairing and reconstructing the drain pan;
   the epoxy base coat being substantially free of volatile organic compounds and building up the drain pan for proper sloping and drainage of condensate water;
   a waterborne intumescing combustion barrier intermediate coat applied on the epoxy base coat that provides a barrier to combustion of the epoxy base coat by expanding and forming a dense structural foam layer; and
   a sealer coating applied to the intermediate coat for water resistance;
   wherein when the epoxy base coat, the combustion-barrier intermediate coat and the sealer coating, are applied to the drain pan, they form a reconstructed or repaired drain pan which is sloped for drainage, thereby precluding the ability of water to pond within the drain pan and thus retarding or eliminating corrosion and microorganism growth.

2. The composite coating system of claim 1, wherein the epoxy base coat comprises substantially all solid material.

3. The composite coating system of claim 1, wherein the epoxy base coat has a thickness of from about 0.001 inches to about 1.0 inch.

4. The composite coating system of claim 1, wherein the epoxy base coat has a thickness of from about 0.001 inches to about 0.5 inches.

5. The composite coating system of claim 1, wherein the epoxy base coat has a thickness of about 0.5 inches.

6. The composite coating system of claim 1, wherein the sealer coating comprises a ceramic latex material.

7. The composite coating system of claim 1, wherein a thickness of the composite coating system is from about 0.001 inches to about 1.0 inch.

8. The composite coating system of claim 1, wherein a thickness of the composite coating system is from about 0.001 inches to about 0.5 inches.

9. The composite coating system of claim 1, wherein a thickness of the composite coating system is about 0.5 inches.

10. The composite coating system of claim 1, wherein the composite coating system has a maximum flame spread index of about 25 and a maximum smoke developed index of about 50 per National Fire Protection Association (NFPA) code.

11. The composite coating system of claim 1, wherein the composite coating system has a maximum flame spread index of about 5 and a maximum smoke developed index of about 0 per National Fire Protection Association (NFPA) code.

12. The composite coating system of claim 1, wherein the reconstructed or repaired drain pan is sloped for drainage to a drain pipe.

13. An HVAC or an air handling system component comprising:
    a component base of the HVAC or air handling system component; and
    a cast-in-place composite coating system for reconstructing or repairing the component, the coating system comprising:
    an epoxy base coat applied to the component base configured to fill holes therein, arrest corrosion, restore surface structure, and build up areas of the component such that it has a slope;
    a waterborne intumescing combustion barrier intermediate coat applied on the epoxy base coat that is configured to provide a barrier to combustion of the epoxy base coat by expanding and forming a dense structural foam layer in response to heat; and
    a sealer coating including a ceramic latex material applied to the intermediate coat for water resistance;
    wherein when the epoxy base coat, the combustion-barrier intermediate coat and the sealer coating are applied to the component, a reconstructed or repaired component is formed which is sloped for drainage, thereby precluding the ability of water to pond on or within the component and thus retarding or eliminating corrosion and microorganism growth.

14. The component of claim 13, further comprising a drain aperture in the component base, wherein the component is a drain pan that is sloped for drainage to the drain aperture.

15. The component of claim 13, wherein the epoxy base coat comprises substantially all solid material.

16. The component of claim 13, wherein the epoxy base coat has a thickness of from about 0.001 inches to about 1.0 inch.

17. The component of claim 13, wherein a thickness of the composite coating system is from about 0.001 inches to about 1.0 inch.

18. The component of claim 13, wherein the composite coating system has a maximum flame spread index of about 25 and a maximum smoke developed index of about 50 per National Fire Protection Association (NFPA) code.

19. The component of claim 13, wherein the component is a floor of an HVAC or air handling system.

* * * * *